United States Patent [19]

Bopp

[11] Patent Number: 4,576,259

[45] Date of Patent: Mar. 18, 1986

[54] TORSION DAMPING MECHANISM WITH VARIABLE DAMPING

[75] Inventor: Warren G. Bopp, Farmington Hills, Mich.

[73] Assignee: Eaton Corporation, Cleveland, Ohio

[21] Appl. No.: 615,017

[22] Filed: May 29, 1984

[51] Int. Cl.$^4$ .................... F16D 3/80; F16D 35/00
[52] U.S. Cl. .................. 192/3.21; 192/3.32; 192/55; 192/58 B; 192/106.1; 464/24; 464/59
[58] Field of Search ............. 192/3.32, 3.21, 58 B, 192/55, 30 V, 106.1; 464/24, 59

[56] References Cited

U.S. PATENT DOCUMENTS

| | | | |
|---|---|---|---|
| 1,962,367 | 6/1934 | Smythe | 192/58 B |
| 1,978,922 | 10/1934 | Wemp | 64/96 |
| 2,143,710 | 1/1939 | Murray | 192/58 B |
| 2,507,999 | 5/1950 | Schjolin | 192/3.5 |
| 2,722,846 | 11/1955 | McDonald | 192/55 X |
| 3,159,987 | 12/1964 | Thompson et al. | 64/27 |
| 3,653,228 | 4/1972 | Tiberio | 464/24 X |
| 3,977,502 | 8/1976 | Chana | 192/3.3 |
| 4,013,154 | 3/1977 | Brown | 192/58 |
| 4,082,139 | 4/1978 | Davis | 464/24 X |
| 4,138,003 | 2/1979 | Malloy | 192/3.29 |
| 4,181,208 | 1/1980 | Davis | 192/106.1 |
| 4,194,604 | 3/1980 | Nichols et al. | 192/3.3 |
| 4,212,380 | 7/1980 | Billet | 192/106.2 |
| 4,317,510 | 3/1982 | Staub, Jr. | 192/48.3 |
| 4,368,807 | 1/1983 | McLean et al. | 188/379 |
| 4,398,436 | 8/1983 | Fisher | 74/688 |
| 4,430,064 | 7/1984 | Lamarche | 464/64 |

Primary Examiner—Rodney H. Bonck
Assistant Examiner—Alan G. Towner
Attorney, Agent, or Firm—C. H. Grace; P. S. Rulon

[57] ABSTRACT

A mechanism (19) disposed in a torque converter housing (24) for damping torsionals in a vehicle driveline. The mechanism comprises a viscous coupling (22) including a housing (64) having two sidewalls (24a, 68) defining a chamber (70) containing a viscous liquid, and a clutch member (72) disposed in the chamber for viscous clutching coaction with the housing. One of the sidewalls (24a) is defined by an end wall of the torque converter housing. The housing and clutch member are interconnected by a spring assembly (20) including flat torsion springs (61, 62) which transmit steady-state driveline torque and isolate driveline torsionals. The inner surfaces (24b, 68a) of the housing each include two circumferentially spaced clutching surfaces separated by the clutch member. The clutch member has oppositely facing surfaces (72b, 72c) each which include two flat circumferentially spaced clutching surfaces. When the clutching surfaces of the housing are disposed opposite the clutching surfaces of the clutch member, the clutching coaction therebetween is a maximum. When the clutching surfaces of the housing are disposed opposite the spaces between the clutching surfaces of the clutch member, the clutching coaction is a minimum.

10 Claims, 7 Drawing Figures

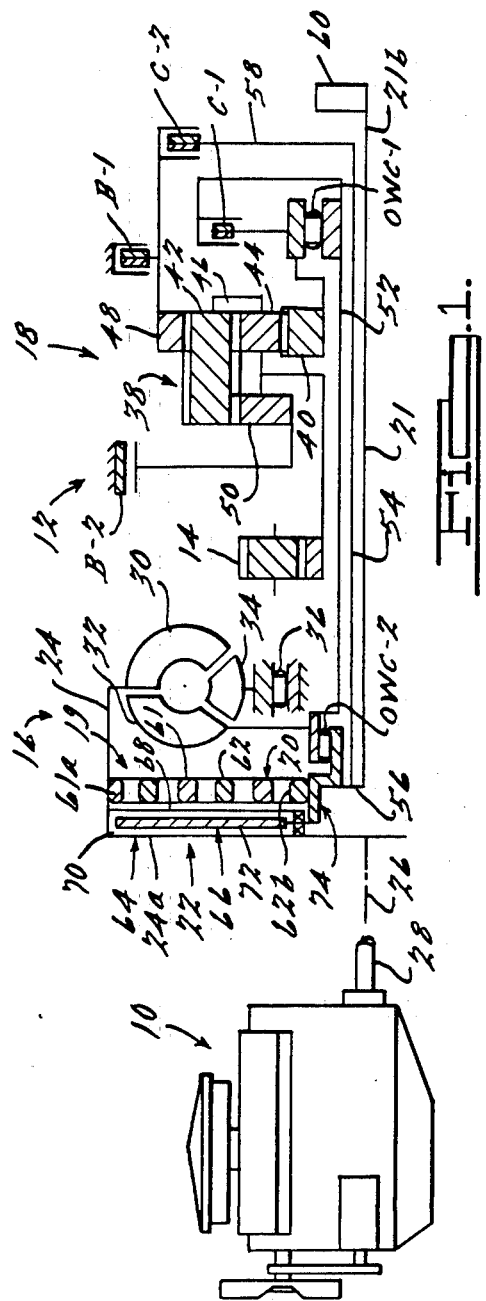

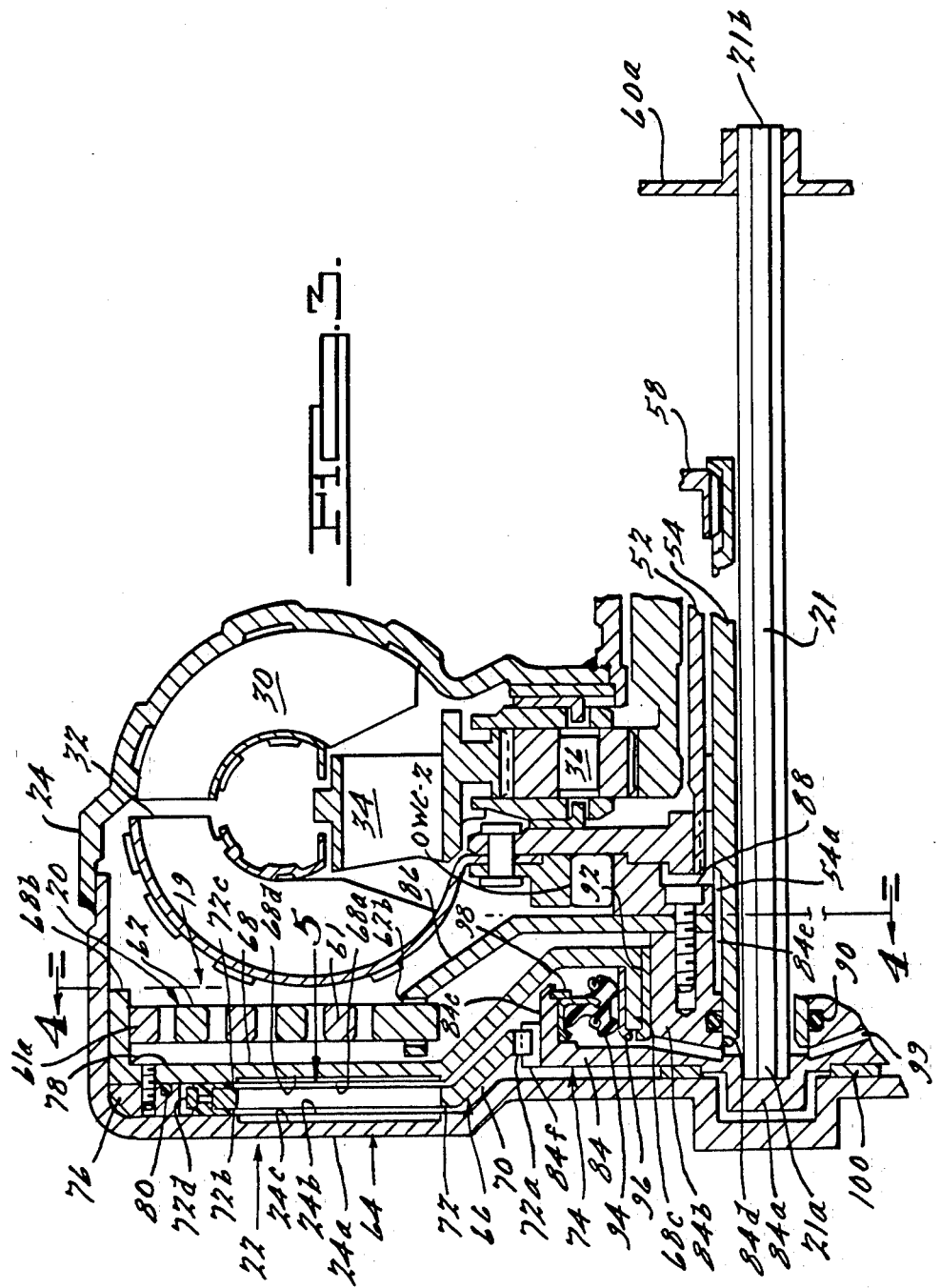

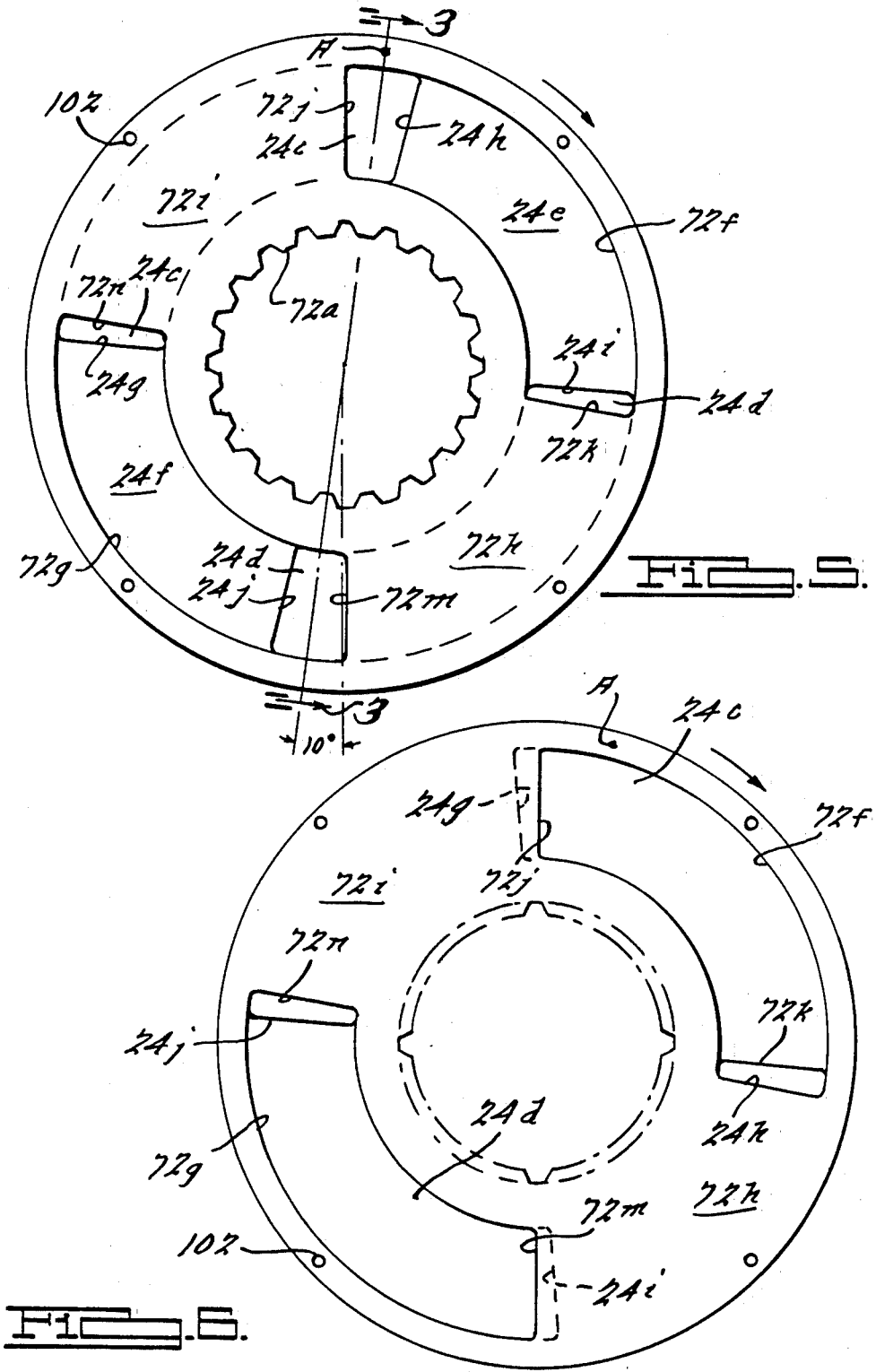

TORSION DAMPING MECHANISM WITH VARIABLE DAMPING

CROSS REFERENCE TO RELATION APPLICATIONS

This application is related to U.S. patent application Ser. No. 564,537, filed Dec. 22, 1983 and to U.S. patent appliation Ser. No. 615,012, filed May 29, 1984. Both applications are assigned to the assignee of this application.

BACKGROUND OF THE INVENTION

This invention relates to driveline torsion damping mechanisms operable over the entire operational range of a driveline. More specifically, the invention relates to such mechanisms for vehicle drivelines.

It is well-known that the speed of an Otto or Diesel engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to torsionals, are transmitted through vehicle drivelines and to passengers in vehicles. The torsionals, which manifest themselves as vibrations, are detrimental to drivelines and derogate passenger-ride quality. Further, when an engine is abruptly accelerated and/or decelerated by accelerator pedal movement, torque pulses ring through the driveline and also derogate ride quality, such pulses are herein also referred to as torsionals.

Since the inception of the automobile, many torsion damping devices or schemes have been proposed and used to isolate and dampen driveline torsionals. For example, master clutches, used in combination with mechanical transmissions, have long employed springs and secondary mechanical friction devices to respectively isolate and dampen torsionals. Typically, torsionals are isolated or absorbed by a plurality of circumferentially spaced, coil springs disposed in parallel between the master clutch primary friction input and splined output. Damping is provided by secondary mechanical friction surfaces disposed in parallel with the springs and biased together with a predetermined force. Damping occurs when the amplitude of the torsionals exceeds the breakaway or slip torque of the secondary friction surfaces. With this arrangement, portions of the torsionals less than the slip torque of the secondary friction surfaces are transmitted directly through the clutch without flexing or isolation by the springs, i.e., the arrangement provides neither torsion isolation nor damping. If the slip torque of the secondary friction surfaces is reduced by design or wear of the secondary surfaces, damping is reduced. Further, any portions of the torsionals greater than the spring energy absorption or storage capacity are also transmitted directly through the clutch. If the spring rate is increased to provide greater storage capacity and prevent spring collapse, the springs transmit lesser amplitude torsionals directly through with little or no effective isolation or absorption of the torsionals.

To increase the operational spring range and storage capacity of a torsion damping assembly, Wemp in U.S. Pat. No. 1,978,922, proposed using a low spring rate torsion sleeve capable of flexing substantially more than the coil springs used with master clutches. This arrangement, like the master clutch arrangement, also employs secondary mechanical friction surfaces disposed in parallel and biased together with a predetermined force to provide damping. Hence, the Wemp arrangement also fails to provide isolation and damping of torsionals below the slip or breakaway torque of the secondary friction surfaces. The Wemp arrangement is also underdamped if the slip or breakaway torque of the secondary friction surfaces is reduced.

The advent of torque converter-type automatic transissions ushered in a whole new perception of torsion damping and, of course, passenger ride quality. While torque converters have many advantages, one being torsional damping, they embody inherent slip and, therefore, inherent losses in vehicle fuel economy. In an effort to minimize this slippage and thereby optimize or improve fuel economy, various efforts have been made to bypass the torque converter with some manner of direct drive which is typically brought into play when a vehicle is operating in the higher speed ratios of the transmission. While these direct-drive bypass arrangements have resulted in fuel economy improvement, they have also brought back driveline vibration with resultant derogation in the vehicle ride quality that passengers have become accustomed to over the years. The direct drive bypasses, for the most part, have been in the form of master type friction clutches with torsion damping devices similar to the previously mentioned devices. One example of such a bypass is disclosed in U.S. Pat. No. 4,194,604. Two further examples of bypass drives are disclosed in U.S. Pat. Nos. 3,977,502 and 4,317,510. In the '502 patent, the master type clutch engagement force is such that the clutch primary friction surface continuously slips or slips in response to torsionals above a predetermined amount. This arrangement is difficult to control since the engagement force must vary with driveline torque. In the '510 patent, the master clutch incorporates a viscous coupling which continuously slips to dampen torsionals in a manner analogous to the continously slipping clutch in the '502 patent. With the arrangement in both of these patents, substantially all of the energy from the engine to the transmission must be transmitted across slipping surfaces; hence, both arrangements generate substantial amounts of heat and, of course, losses in the form of fuel economy. A third bypass arrangement, as disclosed in U.S. Pat. No. 4,138,003, includes the master type clutch in combination with low-rate torsion isolation springs which may be of the helical torsion type or of the torsion bar type analogous to the arrangement disclosed in previously mentioned U.S. Pat. No. 1,978,922. It is also known to use flat torsion springs in vibration dampers, as diclosed in U.S. Pat. No. 4,181,208.

Previously mentioned copending U.S. application Ser. No. 564,537 and entitled Torsion Damping Assembly discloses the use of a viscous coupling in lieu of the secondary mechanical friction surfaces used in the prior art torsional damping mechanisms. Since the clutching medium therein is a viscous liquid, breakaway torque associated with the mechanical friction surfaces is eliminated. Hence, the coupling provides damping over the entire operational or torque range of the assembly. The coupling has a constant damping factor and has provided excellent results in tested vehicles. The torsion damping mechanism disclosed herein improves the assembly of the copending application by varying the damping factor of the viscous coupling therein.

SUMMARY OF THE INVENTION

An object of the present invention is to provide a torsion damping mechanism which is effective to isolate and dampen driveline torsionals over substantially the entire operational range of the driveline.

Another object of the present invention is to provide such a mechanism which varies the damping factor of the mechanism as a function of driveline torque.

Another object of the present invention is to provide such a mechanism, which may be used with many different types of transmissions.

Another object of the present invention is to provide such a mechanism, which is both efficient and reliable and requires no external control.

The torsion damping mechanism of the present invention is adapted for installation in a driveline, having an input drive and an output drive respectively driven by an engine and driving a load. The torsion damping mechanism is disposed between the drives and includes a torsional energy isolating spring(s) and a torsional energy damping device disposed in parallel with the spring; the spring is connected at its opposite ends to the drives and allows limited relative rotation between the drives.

According to a feature of the invention, the torsion damping mechanism includes first and second members mounted for relative rotation about a common axis for clutching coaction therebetween to damp driveline torsionals, and spring(s) interconnecting the members in parallel with the clutching coaction for transmitting steady-state driveline torque between the input and output drives and for isolating driveline torsionals. The improvement comprises clutching surfaces defined by the members and retained against axial and radial movement relative to each other; the surfaces are operative to effect the clutching coaction between the members, and the surfaces are shaped to vary the amount of clutching coaction for varying the amount of damping of the driveline torsionals in response to the level of steady-state driveline torque being transmitted by the spring(s).

According to another feature of the present invention, the first member forms part of an annular housing assembly defining an annular chamber containing a viscous shear liquid, the second member forms part of an annular clutch assembly disposed within the chamber, and the surfaces are operative to vary the amount of viscous clutching coaction and accordingly the amount of damping of the driveline torsionals in response to the relative rotational positions of the surfaces.

BRIEF DESCRIPTION OF THE DRAWINGS

The torsion damping mechanism of the present invention is shown in the accompanying drawings in which:

FIG. 1 is a schematic view of a portion of a motor vehicle driveline, including the torsion damping mechanim of the present invention;

FIG. 2 is a chart showing clutch and brake engagement for shifting the transmission of FIG. 1;

FIG. 3 is a partial, detailed, sectional view of a transmission shown in FIG. 1 with the torsion damping mechanism also shown in detail;

FIGS. 5 and 6 are of viscous clutching members in the mechanism of in FIG. 4 looking in the direction of arrow 5.

DETAILED DESCRIPTION

Figure 4:
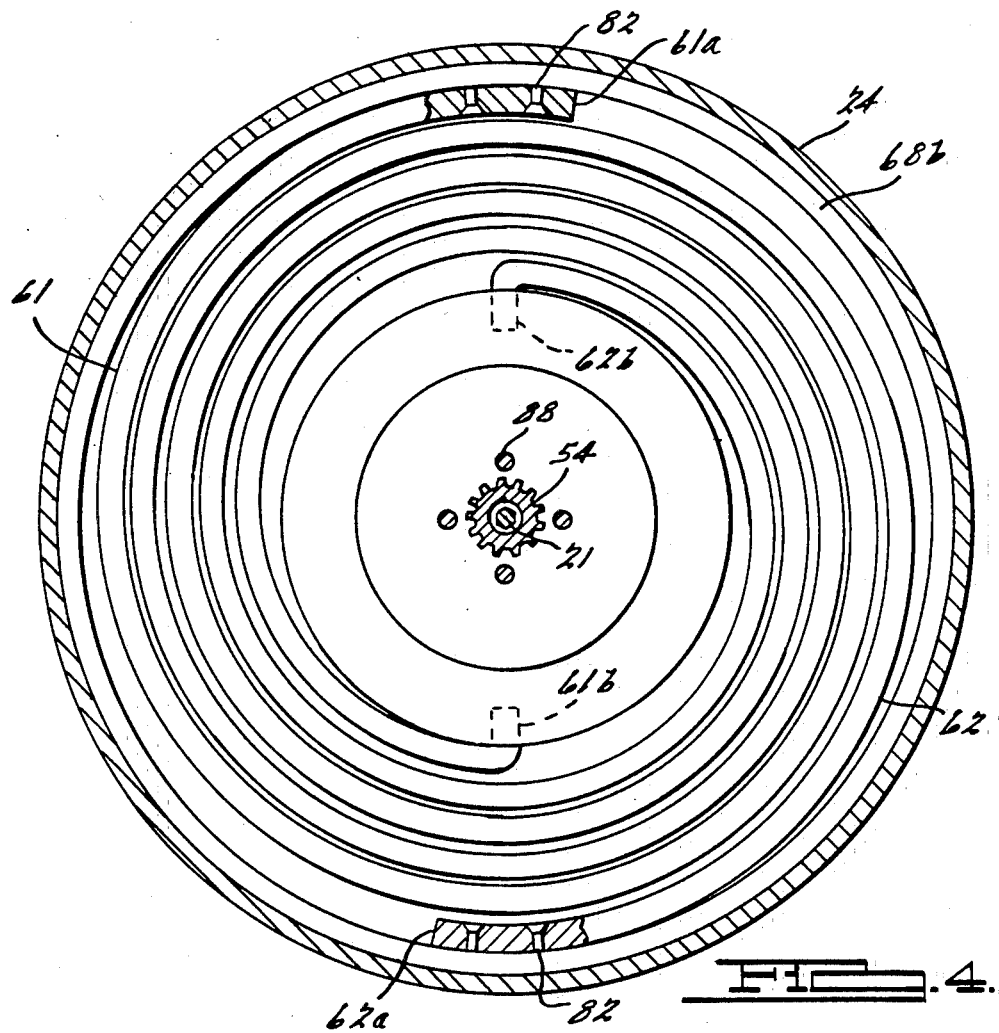
FIG. 4 is an elevational view of the torsion damping mechanism looking along line 4—4 of FIG. 3.

The motor vehicle driveline, seen schematically in FIG. 1, includes an internal combustion engine 10 and an automatic transmission 12 having an output drive or gear 14 for driving a load, such as unshown rear and/or front wheels of a vehicle.

The transmission 12 comprises a hydrokinetic fluid coupling or torque converter 16, a ratio section 18, and a torsion damping mechanism 19 including a spring assembly 20 and a viscous coupling assembly 22. Components 16-22 are substantially symmetrical about a rotational axis defined by a shaft 21 of the transmission and are shown only above the axis for simplicity and brevity.

Torque converter 16 is disposed within a torque converter housing 24 rotationally driven by an input drive 26 connected directly to an output or crankshaft 28 of the engine. Converter 16 may be of any well-known type and includes an impeller 30 driven by housing 24, a turbine 32 driven hydrokinetically by the impeller, and a stator 34 connectable by a one-way roller clutch 36 to a ground such as a nonrotatable portion of the unshown transmission housing.

Transmission 12 is a modified form of the general known class of split input torque transmissions disclosed in U.S. Pat. No. 4,398,436 and British Patent application No. 2,099,091A, both of which are incorporated herein by reference. Ratio section 18 comprises a planetary gear set 38 controlled by friction clutches C-1, C-2, one-day clutch OWC-1 and brakes B-1, B-2 to provide a reverse and three forward speed ratio modes of operation. Planetary gear set 38 includes a first sun gear 40, first and second sets of planetary gears 42, 44 supported by a common planet carrier 46, a ring gear 48, and a second sun gear 50. Sun gear 40 is connectable to a first quill or torque converter driven shaft 52 via clutch C-1 or clutch OWC-1. The first and second sets of planetary gears are in constant mesh with each other, with sun gear 40, and with ring gear 48, respectively. Planet carrier 46 is in constant or direct driving relation with output gear 14. Ring gear 48 is connectable to ground via brake B-1 or to a second quill shaft 54 via clutch C-2. Shafts 21, 54 are fixedly interconnected at 56, and shaft 54 is connected to clutch C-2 via a radially extending flange 58. Sun gear 50 is in constant mesh with planetary gears 42 and is connectable to ground via brake B-2. Ratio section 18 further includes an oil pump 60 driven by shaft 21.

Looking now specifically at torsion damping mechanism 19, spring assembly 20 includes two flat torsion springs 61, 62, more clearly seen in FIG. 4; the viscous coupling assembly 22 includes an annular housing assembly 64 and an annular clutch assembly 66. Housing assembly 64 includes an annular radially extending sidewall member 24a defined by the left wall of torque converter housing 24 and an annular radially extending wall member 68 fixed at its radially outer periphery to housing 24. Walls 24a, 68 define an annular chamber 70 containing a viscous liquid. Annular clutch assembly 66 includes an annular clutch member 72 disposed for limited rotation in the chamber relative to the housing and fixed to a hub assembly 74. The hub assembly is, in turn, fixed to transmission shafts 21, 54, at 56 and to the inner race of a one-way clutch OWC-2 having its outer race fixed to turbine 32. Springs 61, 62 are fixed at their radially outer ends 61a, 62a to housing 24 and at their radially inner ends 61b, 62b to hub assembly 74 in FIG. 1. Hub assembly 74 is clutchable to turbine 32 and quill shaft 52 via one-way clutch OWC-2. Clutches OWC-1 and OWC-2 are preferably of the roller type. Only spring ends 61a and 62b are visable in FIG. 1. Springs 61, 62 resiliently connect torque converter housing 24 directly to transmission shafts 21, 54. The springs also resiliently interconnect coupling assemblies 64, 66 for allowing relative rotational positioning of the assemblies in response to variations in the steady-state driveline torque being transmitted by the springs, and for allowing relative to-and-fro rotation of the assemblies about the steady-state positions of the assemblies in response to driveline torsionals and in response to abrupt changes in driveline torque.

Operation of transmission 12 is in accordance with the FIG. 2 chart, showing clutch and brake engagements to effect the reverse and forward speed ratio modes of operation. In first and reverse, 100% of driveline torque is transmitted to the ratio section via the torque converter (T/C). In second and third, 100% of the driveline torque is transmitted via torsion spring assembly (T/S) 20. When the transmission is in third, clutch OWC-2 engages to provide a torque reaction for sun gear 40. While the transmission is in either second or third, driveline torsionals emanating from the engine are isolated by torsion spring assembly 20 and are dampened by the viscous clutching coaction between members 24a, 68, 72 of the viscous coupling. The damping occurs independent of the steady-state torque in the driveline and independent of the magnitude of the torsionals, since the viscous clutching coaction between members 24a, 68, 72 of the viscous coupling is always proportional to the magnitude of the torsionals. That is, since the members are viscously interconnected, the members will always slip and dampen pulses or torsionals capable of deflecting the torsion springs of spring assembly 20.

The function of torsion damping mechanism 19, as thus far explained, is substantially the same as the torsion damping mechanism disclosed in the previously mentioned copending U.S. patent application Ser. No. 564,537. The viscous coupling in the mechanism of the copending application provides a constant damping factor (viscous clutching coaction) and provides excellent results over the entire driveline torque range of tested vehicles. These results may be further improved by varying the damping factor of the viscous coupling. FIGS. 3–6 herein illustrate a viscous coupling having a variable damping factor as a function of driveline torque.

Mechanism 19 of this application may employ a torsion shaft or helical coil springs such as disclosed in the copending application in lieu of the flat torsion springs disclosed herein. Further, viscous coupling 22 herein may employ concentric interdigitally arranged rings defining viscous clutching surfaces such as disclosed in the copending application in lieu of the flat viscous clutching surfaces disclosed herein.

Looking now at the detailed embodiment of FIGS. 3–6, this embodiment includes means providing the viscous coupling with the variable damping factor feature. The coupling is otherwise substantially the same as schematically illustrated in FIG. 1. In addition to the variable damping factor feature, coupling 22 includes several other advantageous features: (1) the left sidewall 24a of the coupling housing assembly 64 is defined by the torque converter housing, thereby (a) negating the cost of one sidewall, (b) reducing the thickness of the coupling which, at best, is difficult to fit into the available space within the torque converter housing, and (c) negating the need for a second dynamic seal to prevent fluid leakage into and out of the coupling; (2) the flat plate structure of the viscous clutching surfaces further reduces the coupling thickness and additionally reduces the coupling cost since the housing and clutching members 24a, 68, 72 may be formed of stampings requiring little or no machining; and (3) the reduced thickness provided by features 1 and 2 provides space in the torque converter housing for spring assembly 20.

The annular housing assembly 64 is composed of the sidewall members 24a, 68 spaced apart by an annular ring 76 to define chamber 70 and to establish the axial distance between inner surfaces 24b, 68a of the members. Surfaces 24b, 68a are substantially parallel and cooperate with clutch member 72 to define the viscous clutching or working portion of the coupling. Ring 76 is secured to housing 24 by an unshown weld and sidewall member 68 is secured to ring 76 by a plurality of circumferentially spaced screws 78. The outer periphery of chamber 70 is sealed by the weld and a static seal 80. The radially outer portion of sidewall member 68 includes a cylindrical flange 68b having spring ends 61a and 62a secured thereto by screws 82, as may be seen in FIG. 4. The radially inner portion of member 68 includes a cylindrical flange 68c extending axially to the left and defining a bearing surface on its inner surface.

Hub assembly 74 of clutch assembly 66 includes a hub member 84 and an annular radially extending flange member 86 secured to the inner race of clutch OWC-2 by a plurality of circumferentially spaced screws 88. Two radially extending slots in the radially outer portion of flange 86 receive tangs or ends 61b, 62b of springs 61, 62, as fully shown in FIG. 4. Hub member 84 includes a radially inner hub portion 84a, an annular intermediate hub portion 84b, and a cylindrical outer flange 84c. Hub portion 84a includes a blind hexagonal opening mating with a hexagonal portion 21a at the left end of shaft 21. The right end of shaft 21 includes a hexagonal portion 21b received in a mating hexagonal opening in a bracket 60a. The bracket drives oil pump 60, shown schematically only in FIG. 1. The inner surface of hub portion 84b includes a portion 84d receiving a smooth outer surface on the left end of quill shaft 54 and a splined portion 84e mating with splines 54a on the outer surface of the quill shaft. Flow of pressurized transmission fluid along the interface of hub portion 84b and quill shaft 54 is prevented by a static seal 90. A bearing sleeve 92, pressed on the outer surface of hub portion 84b, provides a journal for the bearing surface defined by cylindrical flange 68c of sidewall member 68. Fluid leakage into and out of chamber 70 at the hub is prevented by a single dynamic seal 94 of the double lip elastomer-type pressed at its outer periphery on the inner periphery of cylindrical flange 84c and running on its inner periphery against a sleeve 96 pressed on the outer periphery of cylindrical flange 68c of sidewall member 68. A snap ring 98 prevents axial movement of the seal. Transmission fluid leakage along the journal surface of bearing 92 is directed to an oil return via one or more radially inwardly extending holes 99. Metal-to-metal contact between housing wall 24a and hub member 84 is prevented by an annular thrust bearing 100. The outer periphery of hub member 84 or flange portion 84c includes a plurality of circumferentially spaced teeth or splines 84f.

Clutch member 72 is substantially annular and includes an inner periphery having a plurality of circumferentially spaced splines 72a mating with splines 84f of hub member 84, an intermediate or working portion having oppositely facing surfaces 72b, 72c, and a radially outer portion 72d. Outer portion 72d includes a plurality of circumferentially spaced throughholes each receiving from opposite sides a round antifriction material 102 of T-shaped cross section for centering clutch member 72 in chamber 70.

Looking now at sidewall surfaces 24b, 68a and clutch member surfaces 72b, 72c, as may be seen in FIGS. 3, 5, and 6, surface 24b includes arcuate recesses 24c, 24d each of about 100 arc degrees in length and defining therebetween arcuate clutching surfaces 24e, 24f each of about 80 arc degrees in length. Clutching surfaces 24e, 24f are fully visible in FIG. 5 and partly visible in FIG. 6. The leading/trailing edges of recess 24c, 24d are designated 24g, 24h, 24i, 24j. These edges also define the leading/trailing edges of clutching surfaces 24e, 24f. Surface 68a of sidewall member 68 includes identical arcuate recesses disposed directly opposite recesses 24c, 24d and arcuate clutching surfaces disposed directly opposite clutch surfaces 24e, 24f. The recesses and clutching surfaces of sidewall surface 68a are not shown in FIGS. 5 and 6; one recess designated 68d is visible in FIG. 3. The oppositely facing recesses and arcuate clutching surfaces in sidewall surfaces 24b, 68a provide chamber 70 with axial widths which change stepwise from a maximum to a minimum. Herein the recesses are machined into the sidewalls. However, the recesses may be formed in other ways, e.g., the recesses may be made by deforming the sidewalls outward. Surfaces 72b, 72c also include arcuate recesses or throughopenings 72f, 72g of about 100 arc degrees in length and defining therebetween, on the oppositely facing surfaces 72b, 72c of the clutch member 72, arcuate clutching surfaces of about 80 arc degrees in length. The arcuate clutching surfaces on surface 72b are not shown in the drawing. The arcuate clutching surfaces on surface 72c are designated 72h, 72i, and both are fully visible in FIGS. 5 and 6. The leading/trailing edges of throughopenings 72f, 72g are designated 72j, 72k, 72m, and 72n. These edges also define the leading/trailing edges of the clutching surfaces on the oppositely facing surfaces 72b, 72c.

With a point A on clutch member 72 in FIGS. 5 and 6 taken as a zero degree reference position and with all degree positions taken in a clockwise direction, FIG. 5 depicts recess 24c extending between the 270° and 10° positions, recess 24d extending between the 90° and 190° positions, throughopening 72f extending between the 355° and 95° positions, and throughopening 72g extending between the 175° and 275° positions. In FIG. 6, the rotational position of clutch member 72 is unchanged and housing assembly 64 is rotated 80 arc degrees clockwise. If housing assembly 64 were rotated an additional 5 arc degrees, each of the recesses/throughopenings would be completely disposed opposite each other and likewise each of the arcuate clutching surfaces would be completely disposed opposite each other.

The recess/throughopening and arcuate clutching surface arrangement provides viscous coupling 22 with a clutching or damping factor which varies in response to variations in the relative rotational positions of the arcuate clutch surfaces. When the arcuate clutching surfaces of the sidewall members and the clutch member are all disposed opposite recesses or throughopening, as shown in FIG. 5, the damping factor of the coupling is a minimum. When the arcuate clutching surfaces overlie each other, as substantially shown in FIG. 6, the damping factor of the coupling is a maximum.

Figure 7:
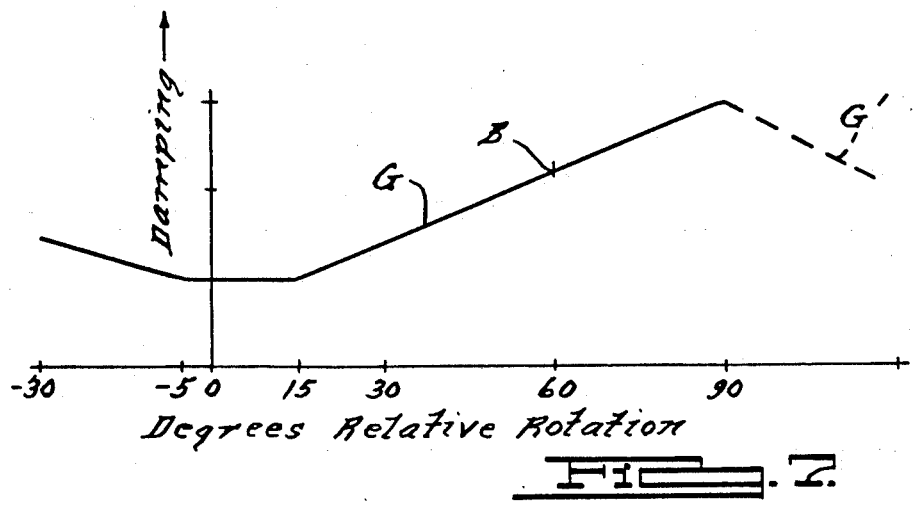
FIG. 7 is a graph schematically illustrating the clutching coaction or damping factor, G, of the members in FIGS. 5 and 6 as a function of their relative positions.

Since housing assembly 64 and clutch assembly are resiliently interconnected by spring assembly 20, the relative rotational position of the arcuate clutching surfaces is controlled by the level of steady-state driveline torque being transmitted by the spring assembly. For example, torsion damping mechanism 19 may be assembled such that the arcuate clutching surfaces are as shown in FIG. 5 when a land vehicle having transmission 12 disposed therein is stopped with the transmission in gear and the engine at the idle throttle position. Under such conditions, the damping factor of the coupling, as shown in the graph of FIG. 7, is at a minimum and varies along curve G in response to driveline torsionals. As steady-state driveline torque is increased in response to higher power demands by the throttle, spring assembly 20 yields and establishes a new position on curve G about which the damping factor varies in response to driveline torsionals. For example, in the idle throttle position of FIG. 5, the damping factor is constant for torsionals which cause relative rotations between −5° and +15°. The damping factor increases for relative rotations greater than the −5° and +15°. As the steady-state torque increases, new relative rotational positions of the arcuate clutching surfaces are established. For example, a 60° relative rotation effected by a steady-state torque, establishes damping factors which vary about a point B on curve G. Spring assembly 20 may be sized such that, under normal operating conditions, 90° of relative rotation occurs. Stops for limiting the amount of relative rotation of housing assembly 64 relative clutch assembly 66 may also be used or in the alternative, greater amounts of relative rotation may be allowed, in which case the damping factor of the disclosed arrangement would then decrease from a peak along a path or curve defined by phantom line G'.

While a preferred embodiment of the present invention has been illustrated and described in detail, it will be apparent that various changes and modifications may be made in the disclosed embodiment without departing from the scope or spirit of the invention. For example, the leading/trailing edges of the recesses and/or the throughopenings in the sidewalls and clutch member may be curved or slanted relative to each other to provide other than the linear damping factor curve of FIG. 7. The viscous coupling housing assembly may be made in a more conventional manner wherein sidewall 24a is not part of the torque converter housing. The torsion damping mechanism may also be used to damp torsionals of many different types of drivelines. The abrupt stepwise shape of the leading/trailing edges of the recesses/throughopening may be tapered. Still further, the sidewalls and clutching member may each have any number of arcuate clutching surfaces, e.g., each may have one arcuate clutching surface of about 180 arc degrees or more than the two arcuate clutching surfaces disclosed herein. The appended claims are intended to cover these and other modifications believed to be within the spirit of the invention.

What is claimed is:

1. A torsional damping mechanism adapted for connection between input and output drives of a torque transmitting driveline; first and second members mounted for relative rotation about a common axis for clutching coaction therebetween to damp driveline torsionals; resilient means interconnecting the members in parallel with the clutching coaction for transmitting steady-state driveline torque between the drives and for isolating driveline torsionals; the improvement comprising:

clutching surfaces defined by the members and retained against axial and radial movement relative to each other, said surfaces operative to effect the clutching coaction between the members and shaped to vary the amount of clutching coaction for varying the amount of damping of said driveline torsionals in response to the level of steady-state driveline torque being transmitted by the resilient means.

2. A torsional damping mechanism adapted for connection between input and output drives of a torque transmitting driveline; first and second members mounted for relative rotation about a common axis for clutching coaction therebetween; resilient means interconnecting the members in parallel with the clutching coaction for tranmitting steady-state driveline torque between the drives, for yielding to establish rotational positions of said members relative to each other as a function of the steady-state driveline torque, and for yielding to allow to-and-fro rotation of the members about the rotational positions in response to driveline torsionals; the improvement comprising:

clutching surfaces defined by said assemblies and disposed in parallel with the resilient means for effecting the clutching coaction, said surfaces retained against axial and radial movement relative to each other, and said surfaces shaped to vary the clutching coaction and accordingly the amount of damping of the driveline torsionals in response to the relative rotational positions of said surfaces.

3. The mechanism of claim 2, wherein said members each define a plurality of said clutching surfaces circumferentially spaced apart and said clutching coaction between the surfaces of one member is a minimum with the clutching surfaces of the other member when the clutching surfaces of each member are disposed opposite the spaces between the clutching surfaces.

4. The mechanism of claim 3, further including a liquid disposed between said members and said clutching coaction is via viscous shear between said clutching surfaces.

5. The mechanism of claim 2, wherein said mechanism includes a viscous coupling defining said members, said members each include at least one clutching surface of arcuate shape having a leading and trailing edge in the direction of rotation of the member defined by recesses adjacent in the member.

6. A torsional damping mechanism adapted for connection between input and output drives of a torque transmitting driveline; the mechanism including an annular housing assembly mounted for rotation about an axis and defining an annular chamber containing a viscous shear liquid; an annular clutch assembly disposed within the chamber for rotation about the axis relative to the housing assembly and for viscous clutching coaction with the housing assembly in response to relative rotation therebetween; one of the assemblies adapted for connection to the input drive and the other to the output drive; the improvement comprising:

resilient means interconnecting said drives for transmitting steady-state driveline torque between said drives, for yielding to establish rotational positions of the assemblies relative to each other as a function of the steady-state driveline torque, and for yielding to allow to-and-fro rotation of the assemblies about said rotational positions in response to driveline torsionals; and clutching surfaces defined by the assemblies for effecting said viscous clutching coaction, said surfaces being retained against axial and radial movement relative to each other, and said surfaces being operative to vary the amount of viscous clutching coaction and accordingly the amount of damping of the driveline torsionals in response to the relative rotational positions of said surfaces.

7. The mechanism of claim 6, wherein said surfaces provide increasing amounts of damping in response to increasing steady-state driveline torque transmitted by said resilient means.

8. The mechanism of claim 6, wherein said surfaces have predetermined surface areas moveable into and out of juxtaposition with each other in response to said relative rotation and operative when in juxtaposition to provide a maximum amount of said damping.

9. The mechanism of claim 6, wherein said assemblies each include at least one of said clutching surfaces, said clutching surfaces disposed for rotation in closely spaced paths and operative when maximum amounts of the projected surface areas the clutching surfaces overlap each other to provide a maximum viscous clutching coaction therebetween, and said clutching surfaces bordered on either side of their paths of rotation by recessed areas which reduce viscous clutching coaction to a minimum when the maximum projected surface areas of said clutching surfaces overlap said recessed areas.

10. The mechanism of claim 9, wherein said pressed areas define the shape of the leading and trailing edges of said clutching surfaces.

* * * * *